US008649523B2

(12) United States Patent
Chau

(10) Patent No.: US 8,649,523 B2
(45) Date of Patent: Feb. 11, 2014

(54) METHODS AND SYSTEMS USING A COMPENSATION SIGNAL TO REDUCE AUDIO DECODING ERRORS AT BLOCK BOUNDARIES

(75) Inventor: Albert Chau, Vancouver (CA)

(73) Assignee: Nintendo Co., Ltd., Kyoto (JP)

( * ) Notice: Subject to any disclaimer, the term of this patent is extended or adjusted under 35 U.S.C. 154(b) by 436 days.

(21) Appl. No.: 13/072,180

(22) Filed: Mar. 25, 2011

(65) Prior Publication Data

US 2012/0243710 A1 Sep. 27, 2012

(51) Int. Cl.
*H04R 5/00* (2006.01)
*H04B 3/00* (2006.01)
*H04R 27/00* (2006.01)

(52) U.S. Cl.
USPC .................. 381/23; 381/77; 381/22; 381/78; 381/81; 381/85

(58) Field of Classification Search
USPC .............................. 381/23, 22, 77, 78, 81, 85
See application file for complete search history.

(56) References Cited

U.S. PATENT DOCUMENTS

| | | | |
|---|---|---|---|
| 4,513,426 A | 4/1985 | Jayant | |
| 4,726,037 A | 2/1988 | Jayant | |
| 5,535,299 A | 7/1996 | Riedel | |
| 5,621,851 A | 4/1997 | Moriya et al. | |
| 5,722,086 A | 2/1998 | Teitler et al. | |
| 5,907,827 A * | 5/1999 | Fang et al. | 704/503 |
| 6,578,162 B1 | 6/2003 | Yung | |
| 7,120,584 B2 | 10/2006 | Sheikhzadeh-Nadjar et al. | |
| 2005/0136956 A1 | 6/2005 | Ohno | |
| 2007/0254591 A1 | 11/2007 | Nassimi | |

* cited by examiner

*Primary Examiner* — Duc Nguyen
*Assistant Examiner* — Anita Masson
(74) *Attorney, Agent, or Firm* — Nixon & Vanderhye P.C.

(57) ABSTRACT

Methods, systems and computer-readable medium reduce and/or eliminate errors in coding/decoding of streamed audio due to resetting of decoder state values based on playback buffer access. An inaudible compensation signal is included with the audio signal. The compensation signal is generated having a characteristic selected so that the encoded streamed audio signal substantially matches the reset state values at block boundaries. In an ADPCM example, the compensation signal is chosen such that the sum of the compensation signal and the original audio signal (=the compensated audio signal) has the characteristic that, at the block boundaries, the compensated audio signal matches the initial predictor value.

37 Claims, 16 Drawing Sheets

Example Non-Limiting Streaming Encoding And Decoding System

Example Non-Limiting Streaming Encoding And Decoding System

Example Encoding Process

Example Encoder

Example Decoder

Example Audio Signal

Example Erroneous Decoded Audio Signal

Example Audio Signal Decoded With Encoder Sychronization

Example Difference Signal From Synchronized ADPCM Encoder

Example Compensation Signal

Example Mixed Original and Compensation Signals

Example Coded Signal

Example Improved Error Signal

Example Consumer Device

Example Audio Section

METHODS AND SYSTEMS USING A COMPENSATION SIGNAL TO REDUCE AUDIO DECODING ERRORS AT BLOCK BOUNDARIES

TECHNICAL FIELD

The technology herein relates to methods and systems for reducing or eliminating digitized audio coding errors. In more detail, the technology relates to methods and systems for reducing and/or eliminating errors produced in decoding streamed ADPCM encoded audio data due to predictor and/or step index value resetting.

BACKGROUND AND SUMMARY

Digital music is now pervasive. Many of us carry portable music players to listen to music on the bus, subway or while travelling to school or work. Internet radio and other network-based music delivery mechanisms deliver audio programming streams to a wide variety of player devices. Audio books can be downloaded in an instant for playback on tablet computers, smart phones, and many other devices. Given the importance of music and audio programming to our daily lives, digital music and audio will only become more important in the future.

Digital audio is often compressed to reduce storage size and/or the time required to transmit or download audio files. Audio compression and decompression algorithms are typically implemented by audio "codecs" (coders/decoders) used in many consumer audio and other devices. Such codec technology has enabled "streaming" of digital audio to provide a potentially endless stream of audio program material for playback. Streaming is a technique that allows playback of a long piece of audio without requiring the entirety of the audio data to be loaded into memory. Such streaming is now commonly used for Internet radio for example where a source encoder continually streams music or other digital audio program data over a network to one or many receivers for playback.

In streaming and other arrangements that decode compressed audio data, a playback buffer is commonly used to temporarily store the next portion of encoded data for decoding. Such playback buffers are used e.g. to prevent interruptions in playback due to delay in retrieving additional data over a bus, network, etc. Streaming in some conventional systems can involve looped playback of a relatively small playback buffer. This small playback buffer has its data continually refilled with new data as data is consumed. This is a little like refilling a coffee carafe before it is emptied so the coffee drinker perceives a seemingly-endless supply of coffee. Even though most consumer devices have some type of playback buffer, not all such devices were designed to facilitate playback of streamed encoded data where the playback buffer is continually refilled with new data.

Some devices may be designed to repeatedly play back short loops, repeatedly playing back the same data from its playback buffers. To facilitate this behavior, the device may reinitialize or reset decoder state values each time the decoder loops back to the start of its playback buffer. This may make the device unsuitable for playing back streamed data, as this behavior can have the effect of de-synchronizing the streaming data encoder from the decoder, resulting in substantial audible distortions in the decoded samples.

For example, errors may occur when the decoder resets its predictor and/or step values when it loops back to the beginning of the buffer, instead of using state values based on previous samples. The user can hear such errors as amplitude variations, pops, clicks, etc. Because the playback buffer typically retrieves playback data in blocks, such errors will naturally occur at block boundaries.

It is sometimes possible in such a system to use an additional mechanism (e.g., programmed microprocessor) to provide a decoder capable of handing streaming data. While this approach has the possibility of providing excellent sound quality, it also increases computational loading of the system (e.g., 10% of the CPU in one example). Providing a way to decode/playback streamed ADPCM or other audio data using an existing decoder not designed for streaming could eliminate the need for an additional (e.g., software based) decoder, and thus reduce memory usage, playback bus traffic, playback CPU load and/or buffering requirements in main memory. Thus, it would be desirable to eliminate distortions and maintain synchronization between the encoder and decoder despite the resetting behavior of the decoder to thereby decode/playback streamed data. Such gains desirably would come with only a slight sound quality penalty versus the best sounding option provided by a soft decoder.

Different methods might be used to calculate the common predictor and step index values with the goal of reducing pops/clicks at the block boundaries. One possible method for example would be to set the predictor for Predictor=x[0] (i.e., the first input sample), and to set step index=f(x)[0]−x[1]) (table lookup based on difference between first and second input samples). An additional possible "Zero" method would be for encoder 114 to reset the predictor and step index values to 0 (Predictor=0, Step Index=0) with the idea that 0 is a better average value for all of the blocks. Another possible "averaging method" would set the predictor and step indexes to average values under an assumption that the actual average is better than an assumed average. For example, it might be possible to use multi-pass weighted averaging. It might also be possible to favor blocks with high error so that the resultant predictor and step index values would be skewed to favor reducing big errors. While these solutions may objectively reduce the error signal, noticeable pops/clicks may still exist.

To solve these problems, embodiments herein generate a compensation signal to provide compensation at block boundaries. A compensation signal operation may involve for example injecting a band-limited pseudo-random noise or ultra low frequency signal at boundary points. It may be possible to inject pre-error into the encoder per se, or to inject such a signal in the source signal before encoding. Thus, after deciding what the predictor value will be, it is possible to add an error signal to the original signal such that the predictor error is 0 and if possible, the step error is 0 also.

In one exemplary illustrative non-limiting implementation, an ultra low frequency (inaudible) signal can be used so the user cannot hear the compensation signal and the signal does not have to be filtered by band-limited output filters. It is also possible to optimize block sizes to use a block size that results in minimizing differences in sample values at the start of block boundaries. These techniques reduce and/or eliminate audible errors in the decoded signal, despite resetting the state values used by the decoder.

Thus, one aspect of certain exemplary embodiments relates to a method, system and/or non-transitory computer readable medium for encoding an audio signal to reduce and/or eliminate errors due to resetting of state values at (some) audio streaming data block boundaries. A compensation signal can be mixed with or included in the audio signal, and the combined signal is encoded. The compensation signal has a characteristic selected so that the encoded audio signal substantially matches the reset decoder state value at block boundaries.

Another aspect of certain exemplary embodiments relates to a portable electronic device that includes a playback buffer for receiving an encoded audio signal, and a decoder programmed or configured to decode the encoded mixed audio signal, using state values that are reset based on playback buffer access. The encoded audio signal includes a compensation signal having a characteristic selected so that the encoded audio signal substantially matches decoder reset state values at block boundaries.

Where the encoding/decoding used are ADPCM encoding/decoding, the state values may be a predictor and/or step index value.

BRIEF DESCRIPTION OF THE DRAWINGS

These and other features and advantages will be better and more completely understood by referring to the following detailed of exemplary illustrative non-limiting implementations in conjunction with the drawings, of which.

DETAILED DESCRIPTION OF NON-LIMITING EXAMPLE EMBODIMENTS

Figure 1:
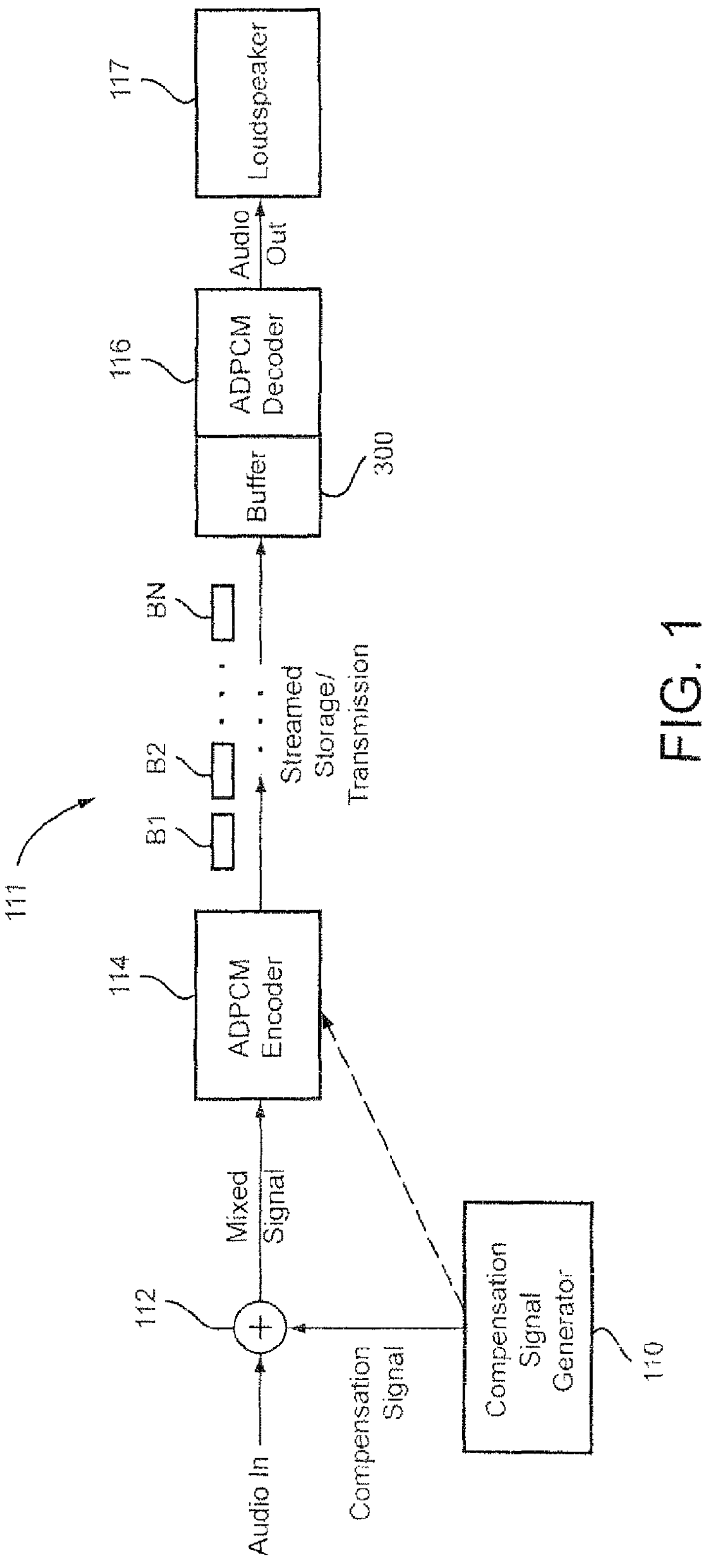
FIGS. 1 and 12 are block diagrams of example non-limiting illustrative streaming audio processing systems.
Figure 12:
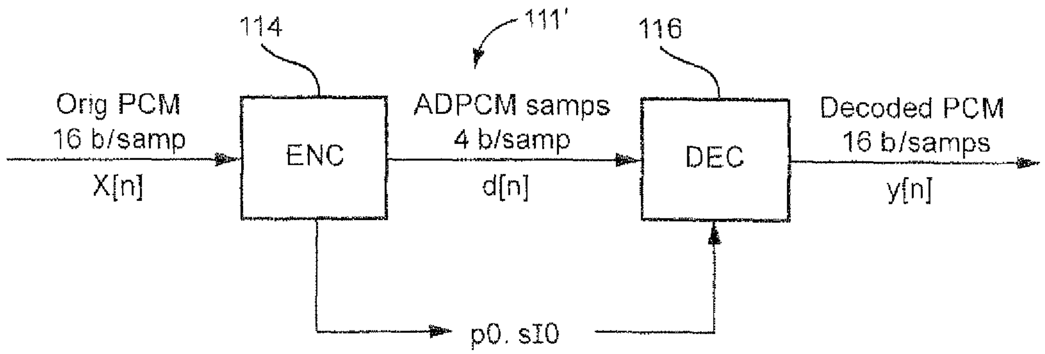

FIGS. 1 and 12 illustrate an example non-limiting audio processing system 111. The system 111 reduces and/or eliminates errors in the output audio signal due to decoder 116 resetting predictor and other decoder state values.

Generally speaking, the first step in digital compression or coding is to convert the audio signal to digital form. Pulse-code modulation (PCM) is one method used to digitally represent sampled analog signals. A PCM stream digitally represents an analog signal. The magnitude of the analog signal is sampled regularly at uniform intervals, with each sample being quantized to the nearest value within a sequence of digital steps. To recreate the analog signal, the PCM signal is reconverted to an analog signal with a DAC (digital-to-analog converter), and amplified for application to a loudspeaker 117, ear buds or the like.

Differential pulse-code modulation (DPCM) is a more compact way to represent the audio signal. It encodes input samples as quantized differences between a current sample and an estimate of a previous sample, known as a predictor value. This technique provides more compact data by encoding differences as opposed to the values themselves.

As is well known, adaptive DPCM (ADPCM) is a variant of DPCM that also varies the size of the quantization steps (step index value), to allow further reduction of the required bandwidth or storage space needed for the encoded signal. The step size is varied dynamically to increase dynamic range, thus accommodating differences between small and large amplitudes. The step index and predictor values usually initially start off at preconfigured values, and then are dynamically readjusted depending on the sample(s) received.

During streamed ADPCM decoding, the ADPCM encoded audio signal is streamed to the ADPCM decoder 116 in a sequence of data blocks B1, B2, . . . Bn. The ADPCM encoded blocks are provided to the ADPCM decoder 116. With ADPCM decoders that are not designed for playing back streaming content but rather designed for playing short, possibly looped sounds, the predictor and step index values used in the ADPCM decoding may be reset at (some) block boundaries. This is likely to occur whenever the decoder 116 must loop back in a playback buffer memory 300 used to temporarily buffer the data blocks while they await decoding.

Figure 1A:
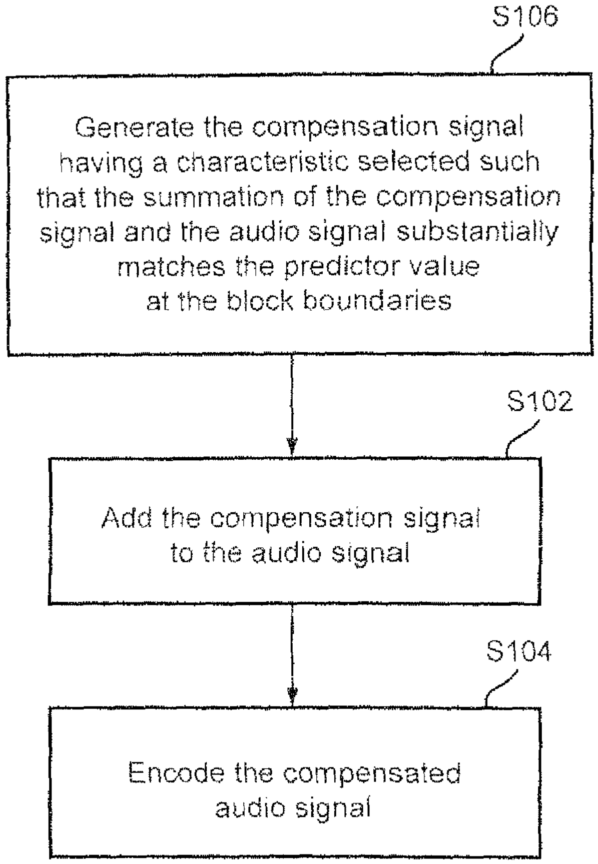
FIG. 1A is a flowchart showing an illustrative non-limiting process for encoding an audio signal to reduce and/or eliminate errors due to re-initialization of decoder state values at block boundaries.
Figure 1B:
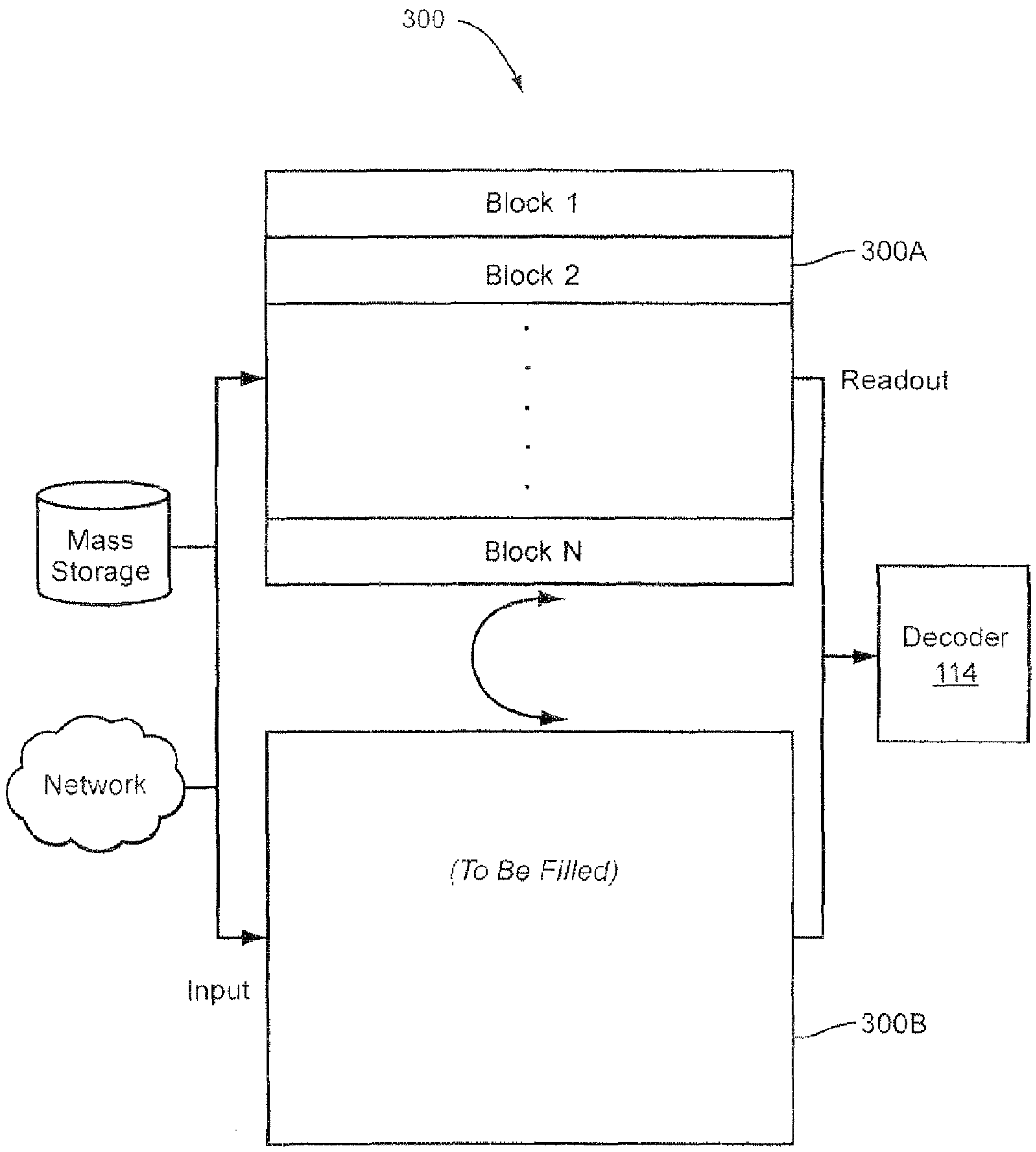
FIG. 1B shows an example playback buffer arrangement.

In more detail, as shown in FIG. 1B, encoded data from a mass storage device, a network or some other source can fill a playback buffer input portion 300B while data in a previously written buffer readout portion 300A can at the same time be consumed. The data is retrieved into playback buffer 300 in blocks (block 1, block 2, . . . block n).

When the mass storage device, network or other source has filled one buffer portion 300A with compressed audio blocks, that portion is made available for readout by decoder 114 and the source begins filling the other (now input) portion 300B. The roles of portions 300A, 300B can be swapped when decoder 114 has consumed the contents of readout portion 300A and starts accessing (new filled) input portion 300B for more encoded data in the continuous stream to decode. In one example, each such swap that causes decoder 114 to reset its buffer address pointer to a new buffer starting address also causes the decoder's predictor and step index values to reset to initial values specified by the header in the block the decoder finds at the new buffer location. This can cause audible discontinuities to occur.

Figure 2:
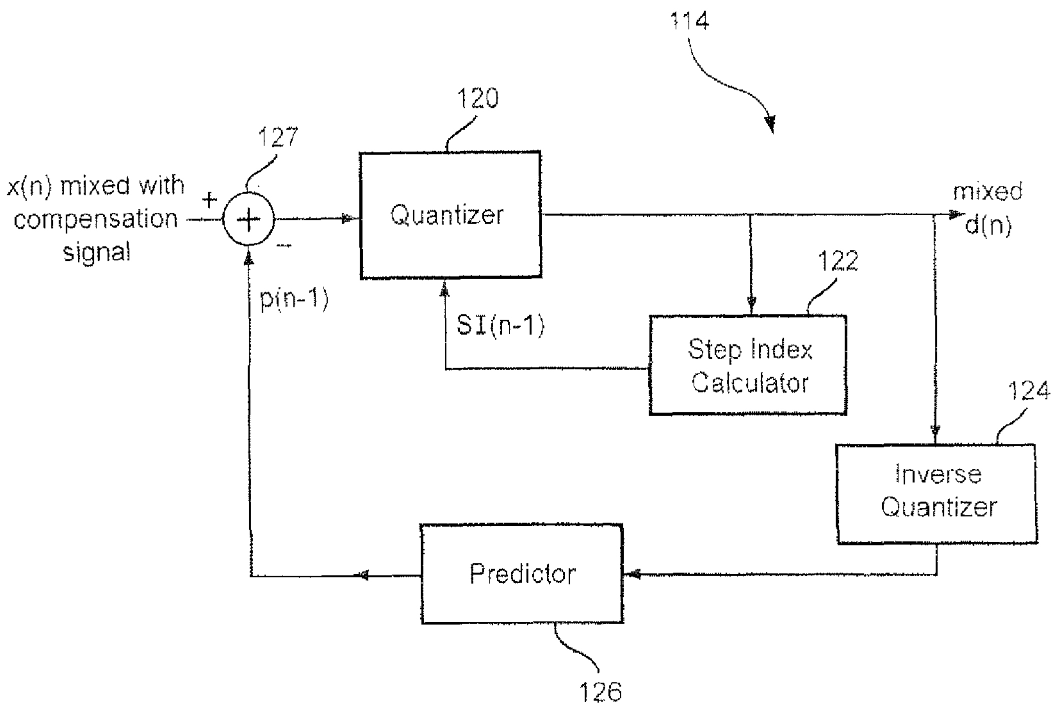
FIGS. 2 and 13 are block diagrams of example non-limiting ADPCM encoders.
Figure 4:
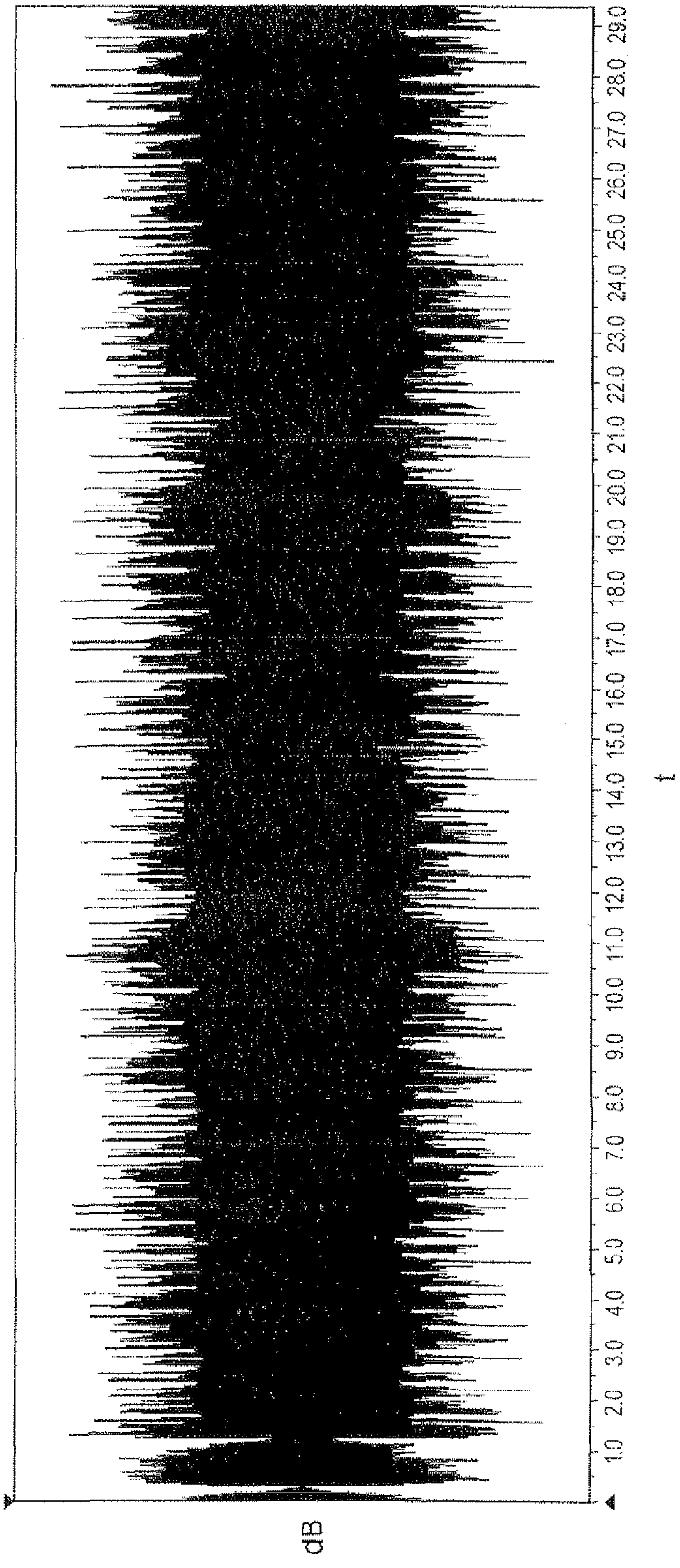
FIG. 4 is an illustration of an example non-limiting audio signal to be encoded.
Figure 5:
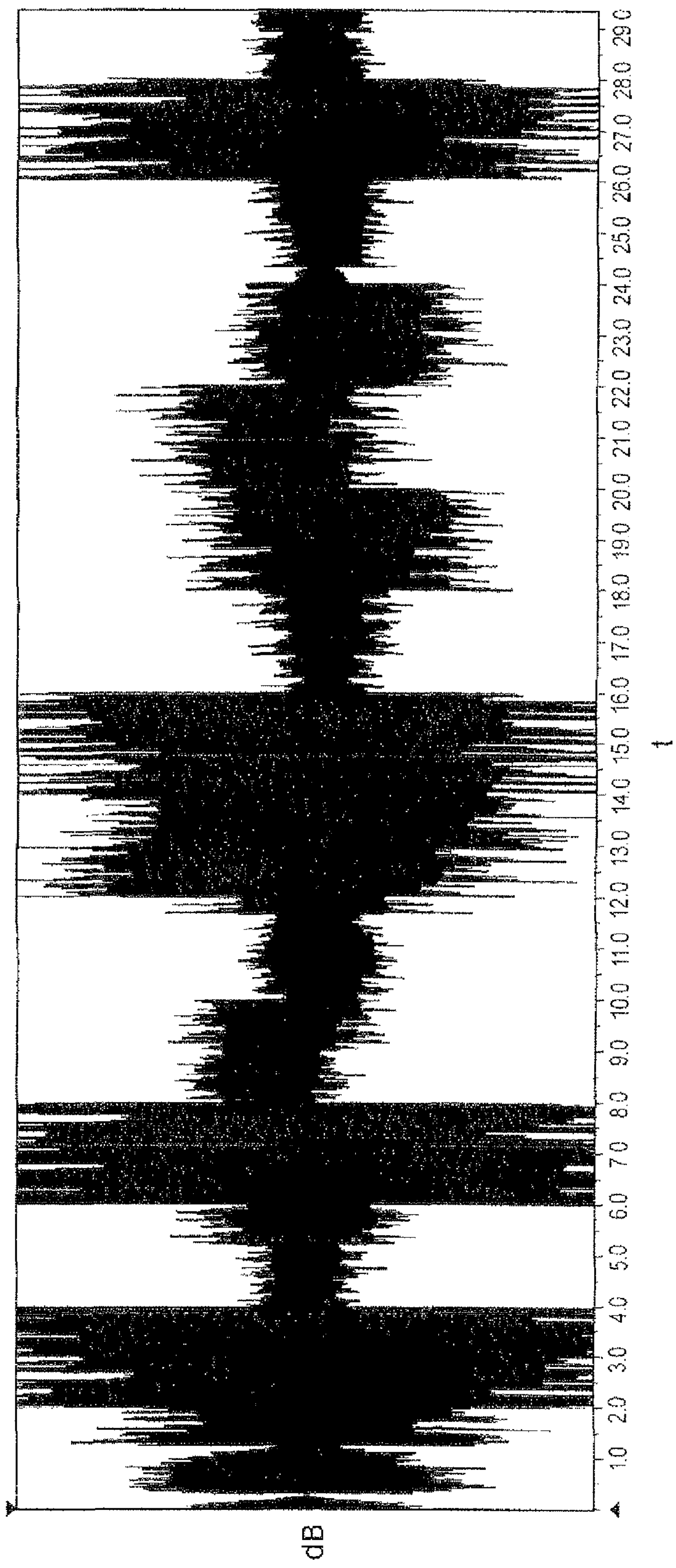
FIG. 5 is an illustration of an example non-limiting ADPCM decoded audio signal exhibiting errors at block boundaries.

As one example, FIG. 4 illustrates an example audio signal to be encoded by encoder 114 illustrated in FIGS. 1 and 2. FIG. 5 illustrates an example of what can happen when a decoder which resets the predictor and step index values at playback buffer loopback is used to decode the streaming data generated by a standard encoder. Note the large audible fluctuations in sound volume at block boundaries. The fluctuations are generated because the predictor and step index values are re-initialized thereby causing the decoder to desynchronize from the encoder at block boundaries. Comparing FIGS. 4 & 5, one can see that the FIG. 5 situation is not acceptable as it does not at all resemble what the audio signal ought to sound or look like.

Given the organization of the encoded data in blocks, the beginning and end of data stored within buffer 300 can always be guaranteed to fall on boundaries between encoded data blocks. Thus, when decoder 114 resets its internal state based on changing its pointer addressing buffer 300 (e.g., to the beginning of the buffer), that change of state can be guaranteed to occur at a block boundary. It is at this point in time that the example implementations can compensate the encoded signal to match the reset predictor and/or step index values to prevent discontinuities.

Some Ways to Synchronize the Encoder with the Decoder

Figure 13:
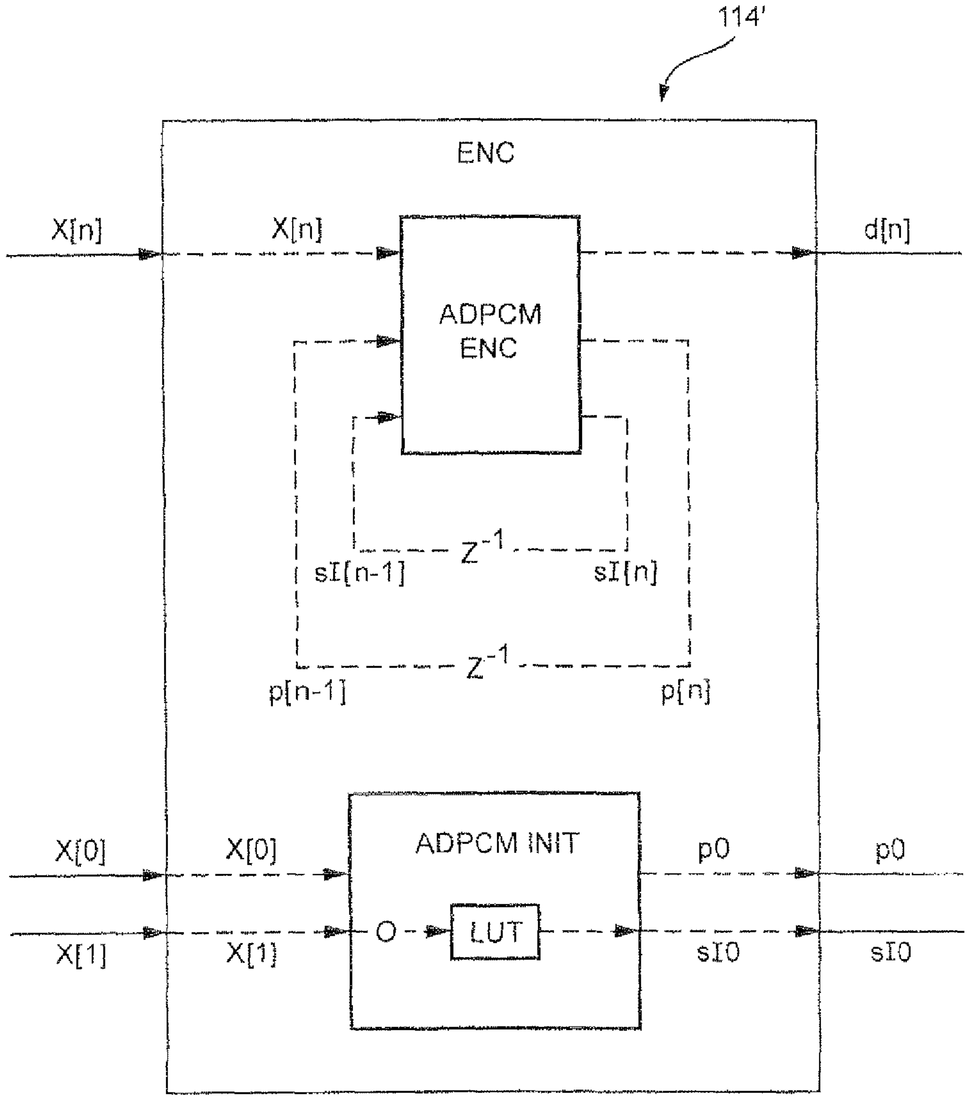

FIGS. 2 and 13 show example non-limiting ADPCM encoders 114. The ADPCM encoder 114 includes a quantizer 120, a step index calculator 122, an inverse quantizer 124, and a predictor 126.

The quantizer 120 quantizes the difference between an input sample x(n) mixed with the compensation signal and an estimation of the previous input sample p(n−1), known as the predictor value, to generate an encoded output d(n). In one possible scenario, the initial predictor and step index values could be set by encoder 114 to match samples 0 and 1 of the audio data in the first block. Because of decoder value resetting due to decoder playback buffer access, the predictor and step index values (which are now reset to their initial values at the block boundaries) are not well suited for the data at the block boundaries for all blocks other than the first block.

Figure 14:
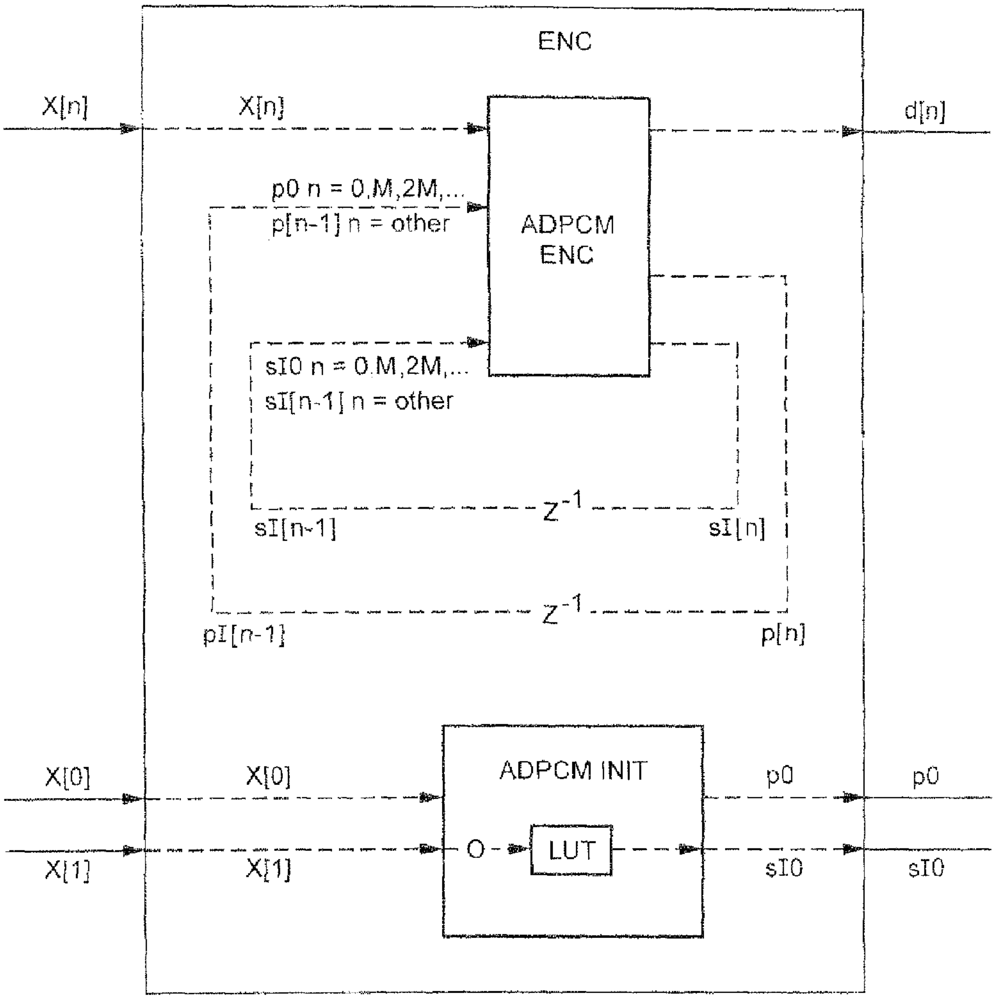
FIG. 14 is a block diagram of a synchronized encoder which modifies the standard decoder to reset predictor and step index values for every block.

One idea for solving this desynchronization problem would be to modify the ADPCM encoder 114 such that the encoder, like the decoder, resets the step index and predictor value at the beginning of some or all blocks of N samples. This would synchronize encoder 114 to the operation of decoder 116. See a synchronized encoder of FIG. 14 which modifies the standard encoder such that it resets the step index and predicted value for every block of N samples to synchronize the encoder to the operation of the decoder discussed above.

Figure 6:
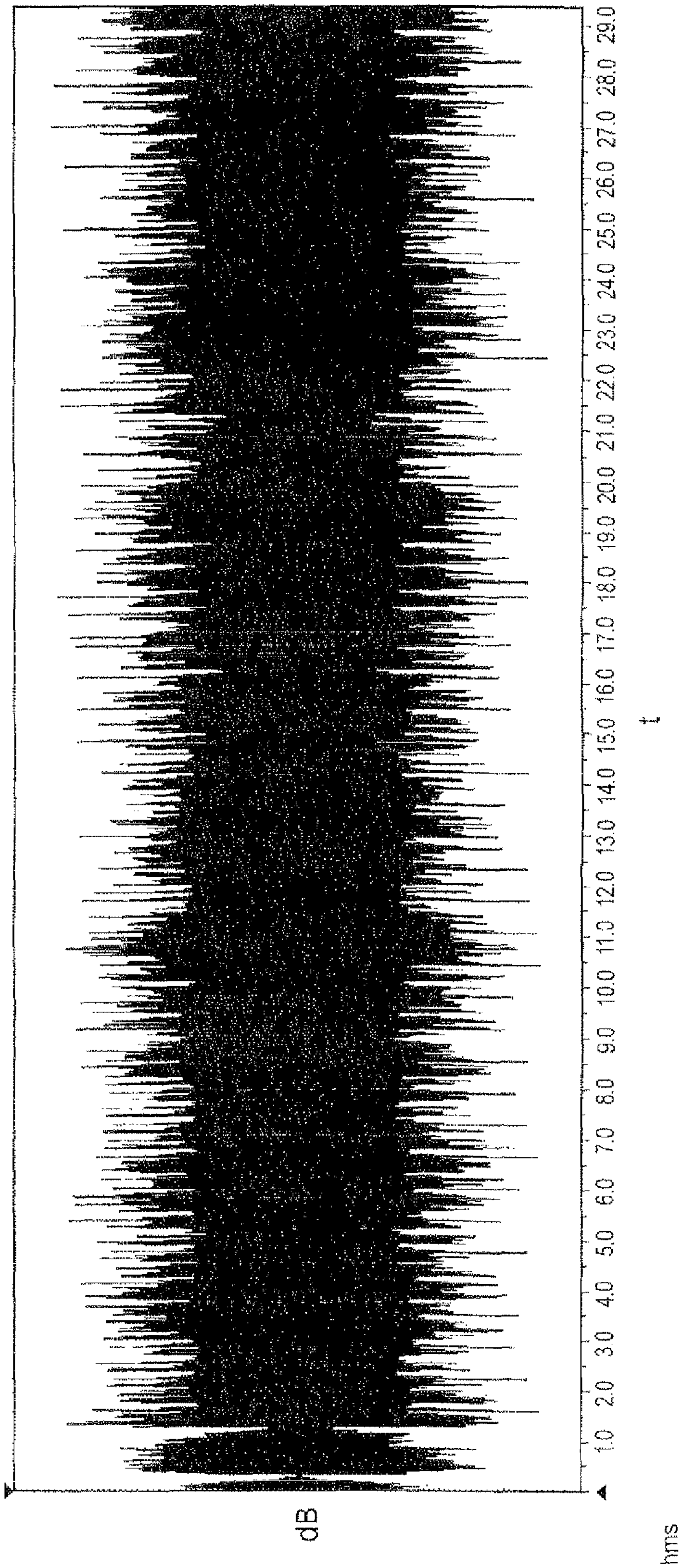
FIG. 6 is an illustration of an example ADPCM audio signal decoded using encoder synchronization techniques.
Figure 6A:
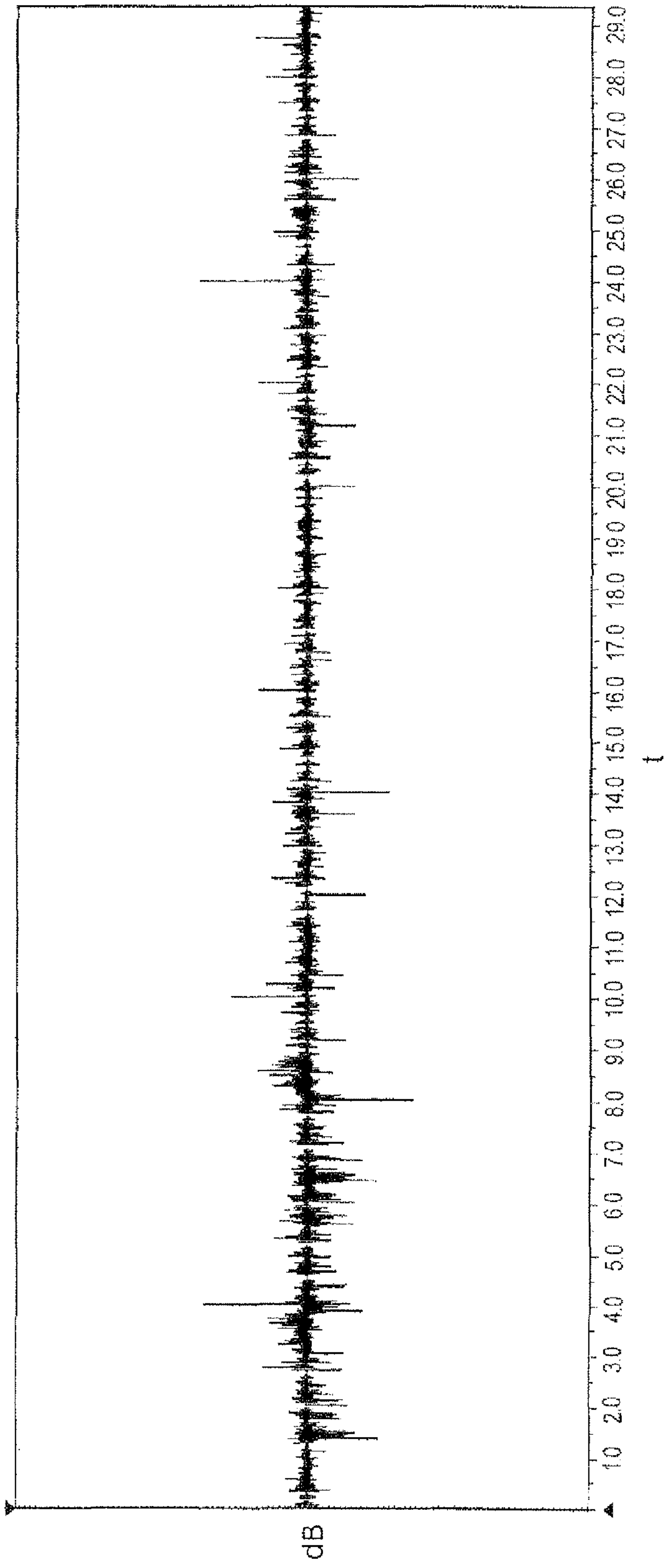
FIG. 6A shows an example difference signal exhibiting pops and clicks at block boundaries.

This approach solves the problem of the large volume fluctuations, but reveals another problem—that of often audible pops/clicks at the block boundaries. FIG. 6 shows audio decoded from an example synchronized encoder, synchronization accomplished through reset of predictor and step index values at block boundaries. FIG. 6A shows an example difference signal. Note the pops and clicks are caused by the Predictor and Step Index values (which are now reset to their initial values at the block boundaries) not being well suited for the data at the block boundaries. In particular, the initial Predictor and Step Index values are typically set to match samples 0 and 1 of the audio data.

Forcing Encoded Signal to Match Predictor Value at Block Boundaries

Note that using the same predictor for all blocks implies that the first sample in each block is expected to be equal (or at least close) to the predictor value. For an arbitrary signal, this will not be the case, hence the pops and clicks. However, if we could force the signal to match the predictor at the block boundaries, then it would be possible to use the same predictor for all blocks and thus provide that the first sample in each block will in fact be equal (or at least close) to the predictor value.

In the exemplary embodiment, the original input audio signal is mixed with a compensation signal such that the combined signal matches the predictor value at block boundaries. If the compensation is inaudible, the end result will still sound like the original signal.

Example Non-Limiting Compensation Solution

Referring once again to FIG. 1, the approach used by the example non-limiting implementation is to introduce a compensation signal generator 110 at the encoder side. The compensation signal generator 110 generates a compensation signal which is used to adjust (e.g. mix with) an audio signal by mixer 112 or direct injection (dotted), producing a compensated audio signal (FIG. 1A, block S102). The compensated audio signal is digitized and encoded by ADPCM encoder 114 (FIG. 1A, block S104), generating an ADPCM encoded compensated audio signal. The ADPCM encoded compensated audio signal may be stored in memory or transmitted. The ADPCM encoded compensated audio signal is decoded by ADPCM decoder 116, producing an audio output signal, which may be played by a device such as loudspeaker 117.

In a non-limiting implementation, the compensation signal generator 110 generates a compensation signal having a characteristic selected such that the summation of the compensation signal and the audio signal substantially matches the predictor value at the block boundaries (see FIG. 1A block S106). The compensation signal is chosen such that the sum of the compensation signal and the original audio signal (=the compensated audio signal) has the characteristic that, at the block boundaries, the compensated audio signal matches the initial predictor value. The compensation signal used to adjust the audio input signal (FIG. 1A block S102) for encoding (block S104) thus reduces and/or eliminates errors that would otherwise be caused by resetting the predictor value. The injected compensation signal may be inaudible (e.g., sub-audible or super-audible) so the end result still sounds like the original signal.

Example Compensation Signal

One idea to provide an inaudible compensation signal is to use a bandlimited pseudo-random noise signal. However, a high-pass noise signal might be audible using sample rates below 32 kHz and the amplitude of the noise signal would need to be large at certain points. Another possibility is to use an amplitude modulated and offset ultra-low frequency signal. An example template signal is one period of a cosine with duration equal to the block size. The amplitude and offset can be derived from the error signal at the block boundary.

Figure 7:
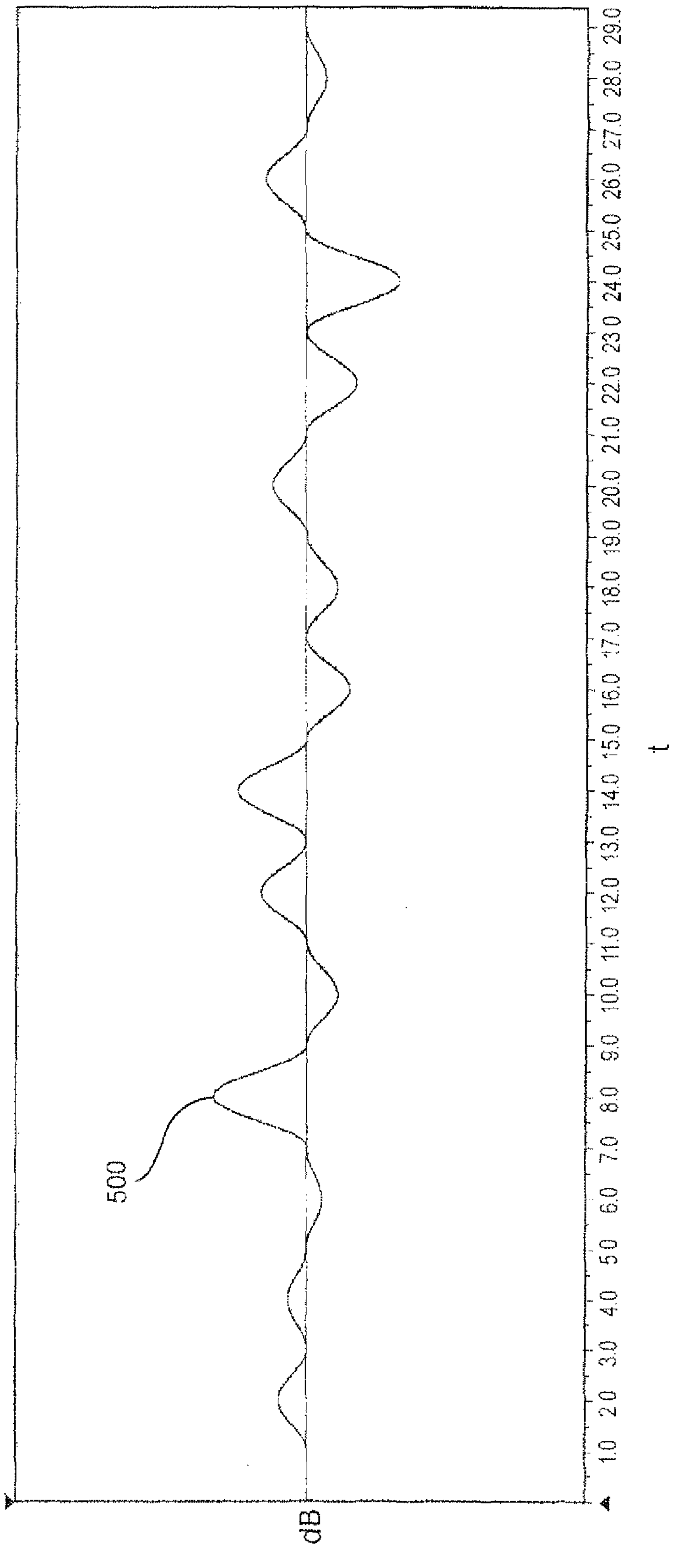
FIG. 7 is an illustration of an example non-limiting compensation signal used to reduce and/or eliminate errors due to re-initialization of predictor values at block boundaries.

FIG. 7 illustrates an example compensation signal 500 generated for the audio signal of FIG. 4. The compensation signal 500 is in the form of an amplitude modulated and amplitude offset cosine signal. It may be an ultra-low frequency signal that is not audible. The periodicity can be set to substantially equal the fixed duration of a block of the ADPCM encoded audio signal. An amplitude and an offset of the compensation signal 500 are derived from determined error at the block boundary. This results in an inaudible signal. Note that the amplitude of the compensation signal can be quite large (e.g., −9.7 dB in the case of the example FIG. 7 signal).

Figure 8A:
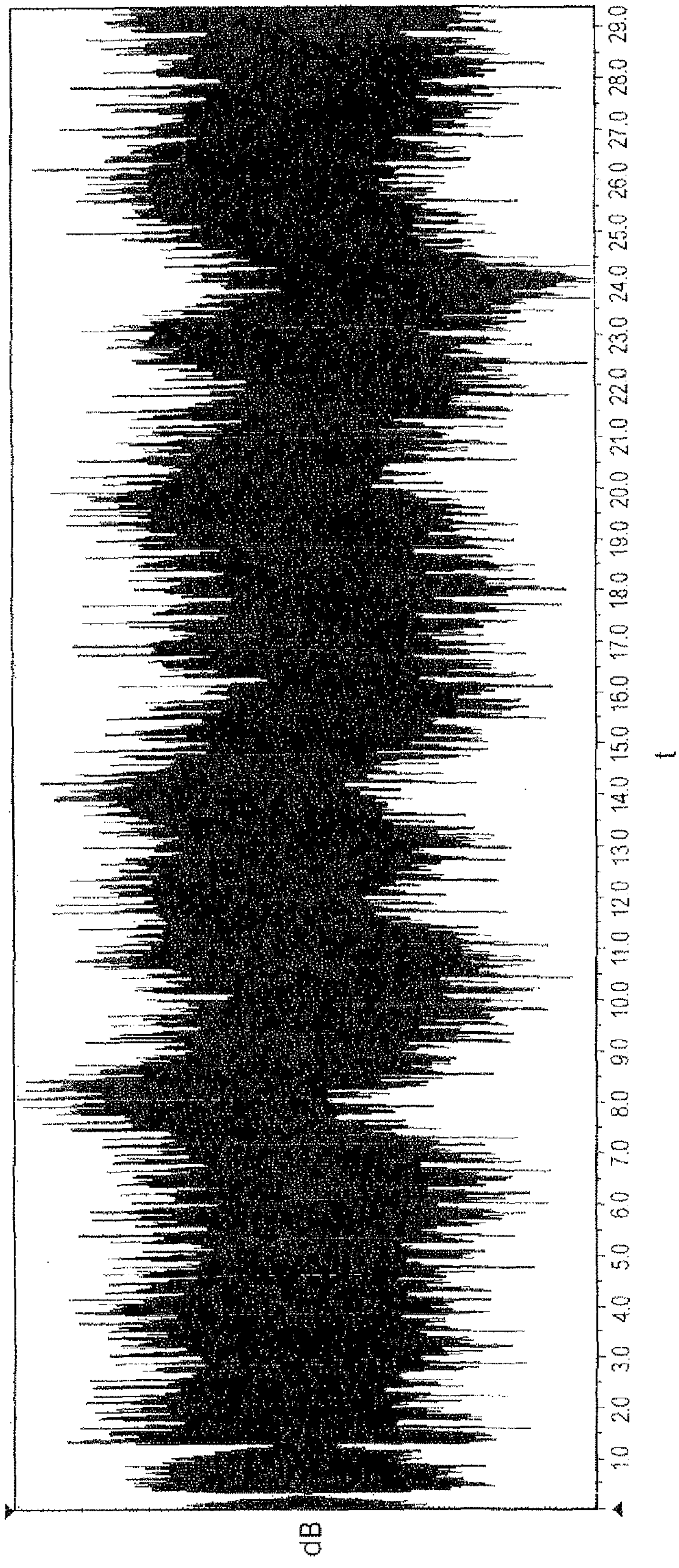
FIG. 8A is an example mix of an original and compensation signal.
Figure 8B:
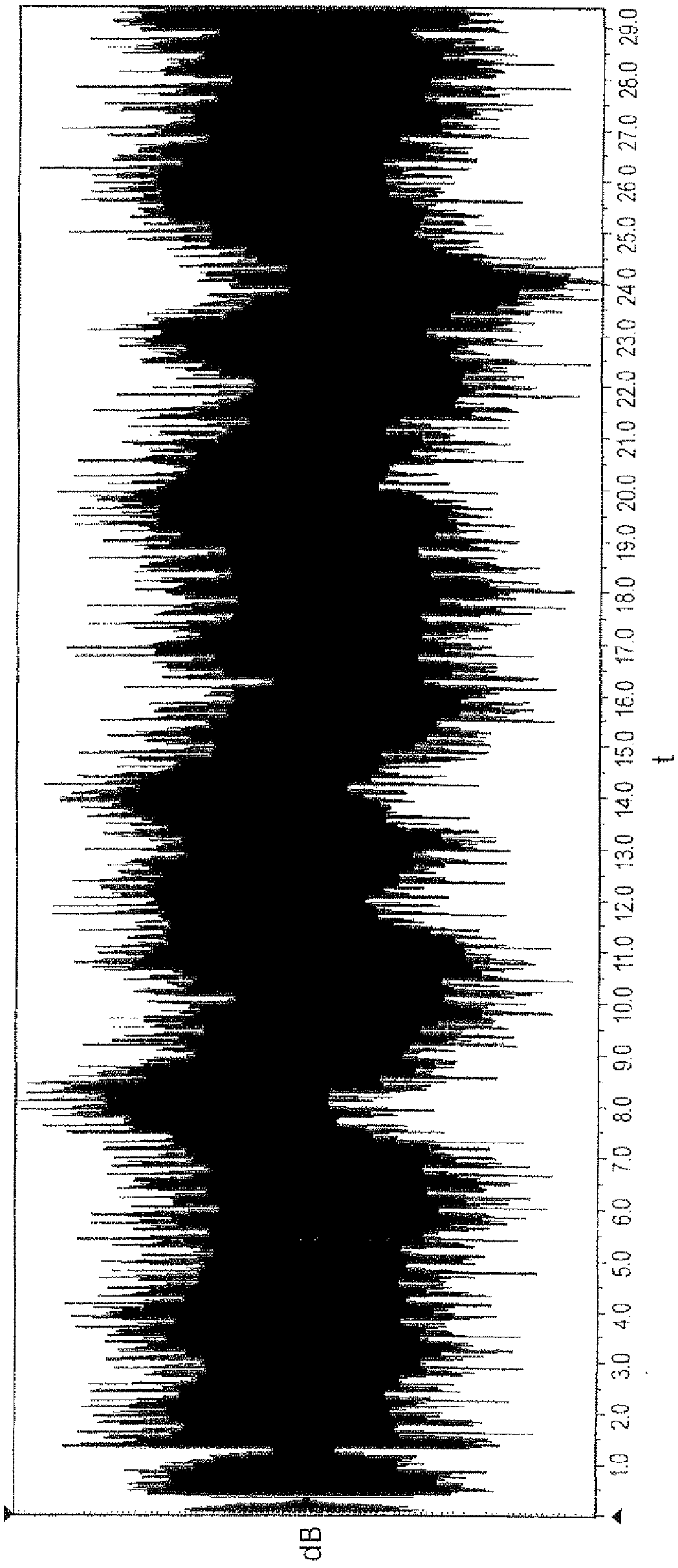
FIG. 8B is an example coded signal.
Figure 9:
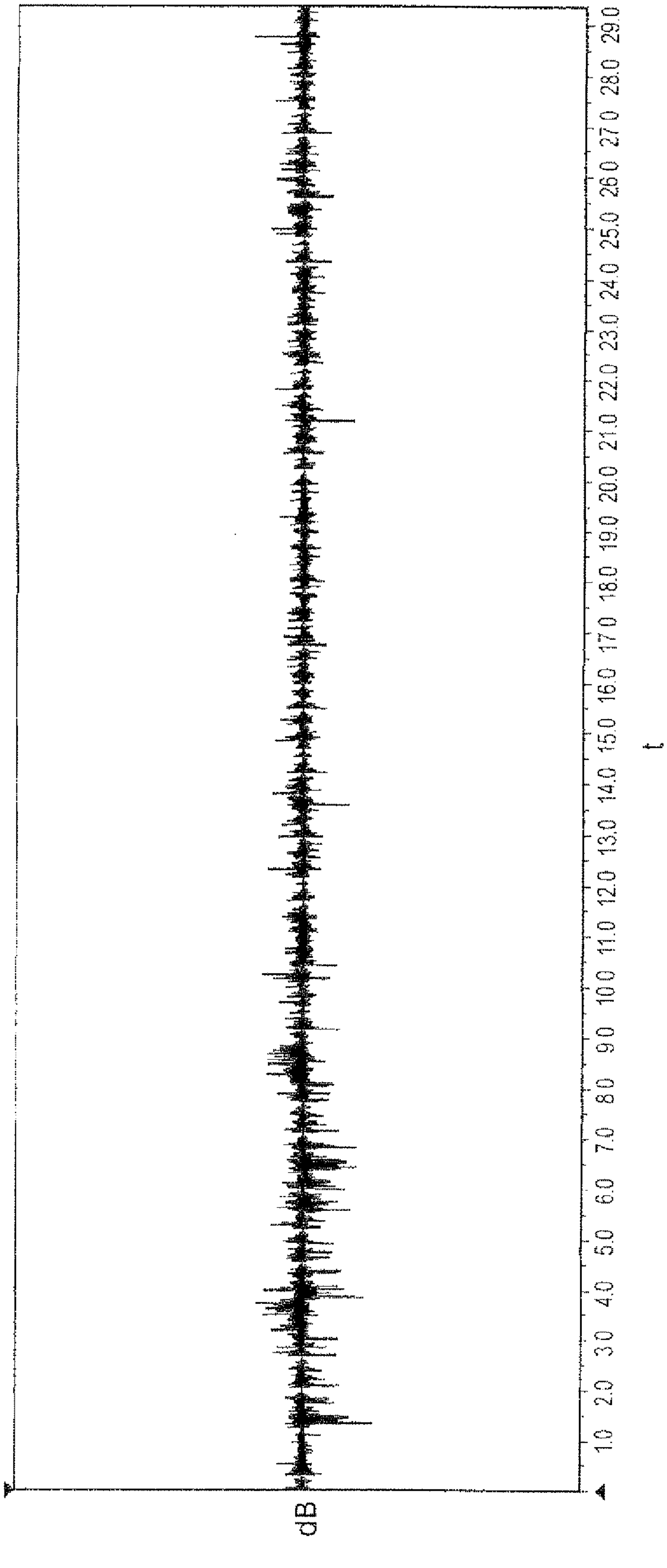
FIG. 9 is an example error signal.

FIG. 8A shows an example mix of the original and compensation signals. FIG. 8B shows an example coded signal. FIG. 9 shows the example resulting improved error signal. Note the error signal does not exhibit pops/clicks and block boundaries.

A characteristic of the compensation signal is selected so that when mixed with the input audio signal, the resultant ADPCM encoded mixed audio signal will substantially match the reset predictor value at the block boundaries. As shown in FIG. 9, the mixing of the audio signal with the compensation signal thus results in errors being reduced and/or eliminated in the decoded audio signal. Using this ultra-low frequency compensation signal method, we have adjusted the signal that we're encoding such that it matches the Predictor at the block boundaries. This gives us zero coding error at the block boundary sample position.

Example Encoder Design

Mixing the original signal with the compensation signal produces an adjusted or mixed output d(n) from the encoder 114 as shown in FIG. 2. The quantizer 120 utilizes a conventional adaptive step index SI (n−1) generated by the step index calculator 122 based on previous quantized samples to provide quantizer 120 with a dynamically adjusted step index.

The inverse quantizer 124 receives the previous quantized sample as an input and performs an inverse quantization. The predictor 126 generates a predictor value p(n−1), which is an estimate of the previous input sample. The predictor value p(n−1) is added to the input sample x(n) as mixed with the compensation signal.

The step index and predictor values may be determined based on conventional ADPCM techniques. For example, the step index and predictor may be determined based on the following formulas, where x is the input sample:

$$\text{Predictor}=\text{average}(\min([x[0],x[M],x[2M],\ldots]),\max([x[0],x[M],x[2M],\ldots]))$$

(chosen to minimize the amplitude of the compensation signal).

$$\text{Step Index}=\text{average}([f(x[0]-x[1],f(x[M]-x[M+1],f(x[2M]-x[2M+1],\ldots])$$

Example Decoder

Figure 3:
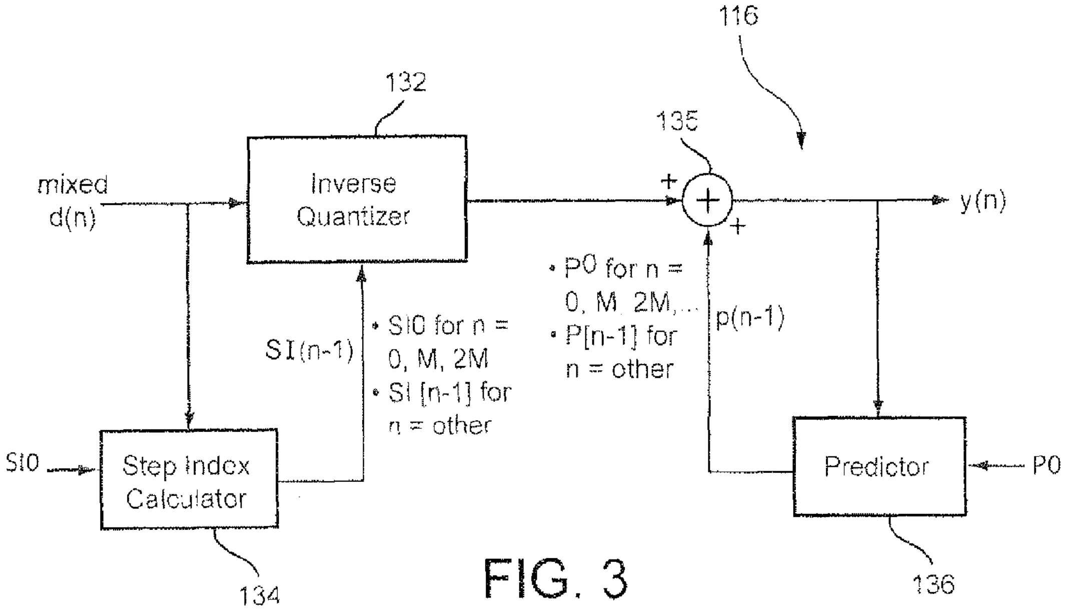
FIG. 3 is a block diagram of an example non-limiting ADPCM decoder.
Figure 15:
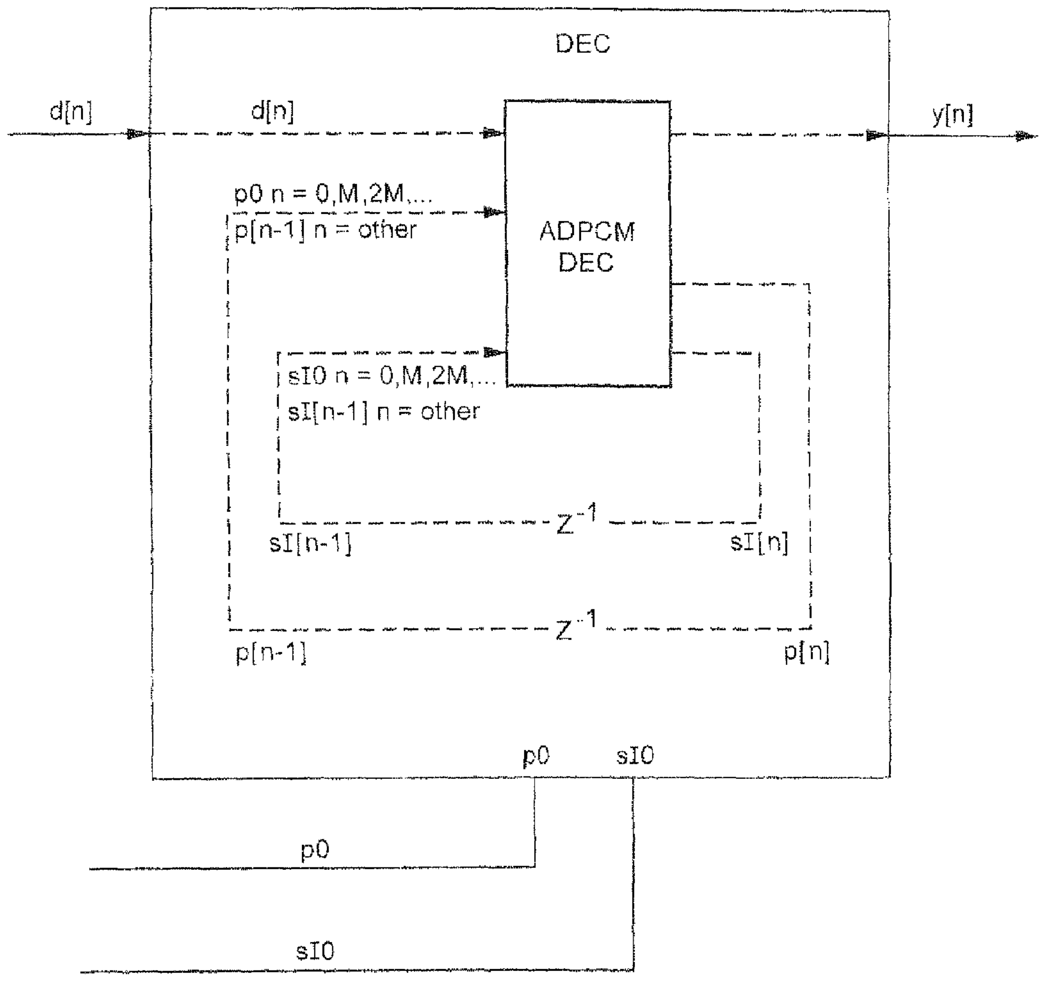
FIG. 15 is a block diagram of an example improved ADPCM decoder.

An example non-limiting ADPCM decoder 116 illustrated in FIGS. 3 and 15 includes an inverse quantizer 132 that performs an inverse quantization of the encoded mixed sample d(n) utilizing the adaptive step index (adjusted based on the previous sample) calculated by the step index calculator 134, and adds the inverse quantized signal to a predictor value p(n−1), resulting in the decoded signal y(n).

Note the resetting behavior of p0, SI0 indicated at n=0, M, 2M, . . . .

In one particular non-limiting example implementation for particular example non-limiting decoder hardware, the encoded mixed data d(n) may be sequentially decoded by the decoder 130 in for example 16-byte samples of encoded mixed data (see FIG. 12). For example, the encoded mixed data may be stored in a plurality of blocks of data, each of the blocks of data including a plurality of 16-byte (or other sized) samples of encoded mixed data. As one specific non-limiting example, each block of encoded mixed data may include 32,768 bytes of data, although other size blocks may be used. Where each of the blocks are stored in a buffer 300 before decoding, the buffer size may dictate or inform the size of each of the blocks of data. In one example non-limiting implementation, the read size from source memory into the buffer may be a multiple of 512 bytes, the source range of the transfer is aligned to 512 bytes, and the destination buffer is 32-byte aligned.

In one specific non-limiting example, the buffer 300 may be in the form of a streaming double buffer as shown in FIG. 1A. The streaming double buffer may for example be set up as:

|4 B|double buffer size| with the double buffer portion 32-byte aligned (effectively allocate an additional 32 bytes, and waste the leading 28 bytes). Double buffering allows one part of buffer 300 to be consumed while another part is being filled. In one example implementation, the block size is set equal to the Double Buffer size which is twice the swap size. For 2 seconds of double buffered data at a 32 kHz sampling rate, this is 64,000 samples. This implies a 32000 byte double buffer and 16000 byte swap size in one specific non-limiting example.

The decoder 116 may be implemented in hardware, e.g., a special purpose chip, software, or both. Whenever the decoder addresses the beginning of buffer 300 (see FIG. 1B), the device or programming controlling the decoding may reset the predictor and/or step index values.

Example Step Index Compensation

Using the above approach, the step index is still a compromise. An additional step index compensation signal may be injected to adjust the audio signal prior to ADPCM encoding. The step index compensation signal may have a characteristic selected to reduce and/or eliminate errors produced due to resetting of the step index value at the block boundaries. The step index compensation signal may be a high frequency band-limited noise signal, for example, or an Fs/2 tone such that (x[iN]−x[iN+1]) corresponds to the selected Stepindex value. The relative benefit might be minor however, and it is desirable that any additional injected signal should be inaudible.

Example Implementation

As mentioned above, electronic devices may be utilized with certain exemplary embodiments, where the electronic device decodes ADPCM encoded audio data, and resets the predictor values and/or step index values at the block boundaries. The encoded audio data used in such electronic devices may be mixed with or otherwise include a compensation signal to reduce and/or eliminate errors caused by resetting the predictor values at block boundaries. Such ADPCM encoded compensated audio data may be stored on the electronic device in memory, may be transmitted or downloaded to the electronic device, or may be otherwise provided to the electronic device on a memory device, such a disc, a thumb drive, a memory cartridge, etc.

An illustrative portable electronic device 200 with which the improved ADPCM encoding/decoding may be used will now be described in connection with FIGS. 10, 11 and 15. The portable electronic device 200 may optionally include one or more display screens 211, 212, which may be LCD screens or the like. A CPU (central processing unit) 223 may control the portable electronic device 200. The CPU 223 may include a work RAM (working storage unit) 224, a GPU (graphic processing unit) 222, and a peripheral circuit I/F (interface) 225 that are electrically connected to one another. The work RAM 224 is a memory for temporarily storing, for example, programs to be executed by the CPU 223 and calculation results of the CPU 223. The GPU 222 uses, in response to an instruction from the CPU 223, a VRAM 221 to generate an image for display output to a first LCD (liquid crystal display unit) 211 and a second LCD 212, and causes the generated image to be displayed on the first display screen 211*a* of the first LCD 211 and the second display screen 212*a* of the second LCD 212. The peripheral circuit I/F 225 is a circuit for transmitting and receiving data between external input/output units, such as the touch panel 213, the operation keys 214, and the loudspeaker 215, and the CPU 223. The touch panel 213 (including a device driver for the touch panel) outputs coordinate data corresponding to a position input.

Furthermore, the CPU 223 is electrically connected to the external memory UF 226, in which the memory 217 is inserted or installed. The memory 217 may be a storage medium for storing the instructions and, specifically, includes a program ROM 217*a* for storing programs and a backup RAM 217*b* for rewritably storing backup data. The programs stored in the program ROM 217*a* of the memory 217 are loaded to the work RAM 224 and then executed by the CPU 223. In the present embodiment, an exemplary case is described in which the programs may be supplied from an external storage medium 217 to the portable electronic device 200. However, the program may be stored in a non-volatile memory incorporated in advance in the portable electronic device 200, or may be supplied to the portable game machine 200 via a wired or wireless communication circuit.

The programs stored in the program ROM 217$a$ of the memory 217 may include video data and/or audio data. The audio data stored on the cartridge 217 may be encoded by an encoding method such as ADPCM encoding prior to being stored on the memory 217. The audio data may be mixed with the compensation signal, as described above, to eliminate and/or reduce audio errors produced during ADPCM decoding, where the predictor value and/or step index value is reset for each block of audio data.

Figure 10:
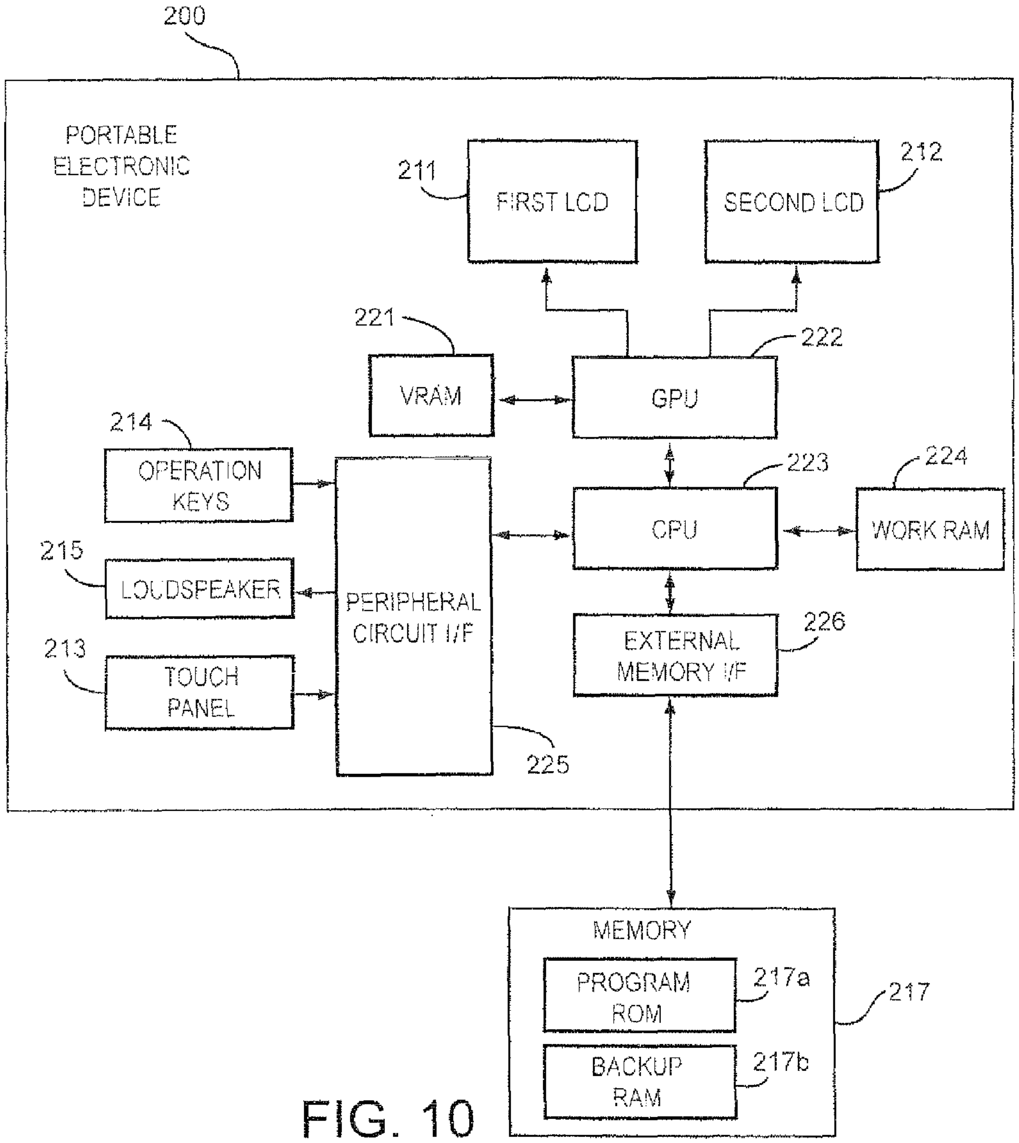
FIG. 10 is a block diagram showing an example non-limiting portable electronic device.
Figure 11:
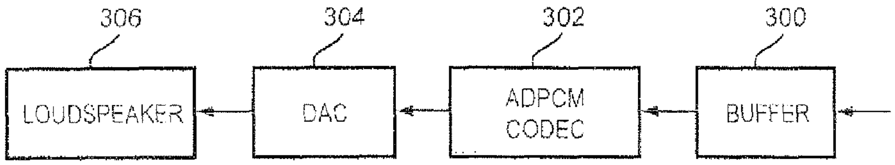
FIG. 11 is an illustration showing detail of an example non-limiting portable electronic device audio section.

As illustrated in FIG. 11, the portable electronic device of FIG. 10 may also include a buffer 300 for temporarily storing blocks of the ADPCM encoded mixed audio data prior to being decoded by ADPCM codec 302. The portable electronic device 200 may be configured to reset the predictor and/or step index values used in ADPCM decoding each time it re-initializes its memory pointer to begin playing at the beginning of the buffer. After ADPCM decoding, the decoded data may be directed to DAC (digital-to-analog converter) 304, which may convert the decoded data to an analog signal and amplify it, prior to the signal being directed to loudspeaker 306 (corresponding to loudspeaker 215 of FIG. 10). The ADPCM codec 302 and the DAC 304 may be embodied in software and/or in hardware.

Thus, the audio data stored on the memory 217 may be adjusted by being mixed with a compensation signal as described above, since the portable electronic device 200 is configured to re-initialize or reset the predictor values utilized by the ADPCM decoding when it loops back in its buffer. In this way, the audible errors in the decoded audio signal that would otherwise occur due to re-initializing of the predictor values are eliminated and/or reduced.

A system that may be used to encode and/or decode data according to exemplary embodiments may not include all of the elements illustrated in FIGS. 10 and 11. The system may be embodied within an electronic device. For example, the electronic device may be a desktop computer, a laptop computer, a handheld computer, a handheld communication device, a cell phone, a personal digital assistant (pda), another type of computing device, a gaming device, or the like. The system may include a memory, a processor, input/output (I/O) devices, a display and a bus similar to the FIG. 10 embodiment. The bus may permit communication and transfer of signals among the components of the system.

The processor may include at least one conventional processor or microprocessor that executes instructions. The processor may be a general purpose processor or a special purpose integrated circuit, such as an ASIC, and may include more than one processor section. The processor may be specifically designed for the encoding and/or decoding of data, e.g., ADPCM encoding and/or ADPCM decoding of data. Additionally, the system may include a plurality of processors.

The memory may be a random access memory (RAM) or another type of dynamic storage device that stores information and instructions for execution by the processor. The memory may also include a read-only memory (ROM) which may include a conventional ROM device or another type of non-volatile storage device that stores information and instructions for the processor. The memory may be any memory device (e.g., semiconductor memory) that stores data for use by the system, and may comprise a non-transitory computer readable medium having encoded therein instructions for encoding of data. The memory may also store signals to be encoded, such as audio signals.

The input/output devices (I/O devices) may include one or more conventional input mechanisms that permit a user to input information to the system, such as a microphone, touchpad, touch screen, keypad, keyboard, mouse, pen, stylus, voice recognition device, buttons, etc., and output mechanisms such as one or more conventional mechanisms that output information to the user, including a display, one or more speakers, a storage medium (or storage media), such as a semiconductor memory device, a magnetic, optical or magneto-optical device, disk drive, a printer device, etc., and/or interfaces for the above. The display may typically be an LCD or CRT display as used on many conventional computing devices, or any other type of display.

The system may perform functions in response to processor by executing sequences of instructions or instruction sets contained in a computer-readable medium, such as, for example, the memory. Such instructions may be read into the memory from another a storage device, or from a separate device via a communication interface, or may be downloaded from an external source such as the Internet. The system may be a stand-alone system, such as a personal computer, or may be connected to a network such as an intranet, the Internet, or the like.

The memory may store instructions that may be executed by the processor to perform various functions. For example, the memory may store instructions to allow the system to perform various functions, such as encoding and/or decoding of data.

The exemplary embodiments may thus be provided on portable or non-portable electronic devices, such as computer systems, and/or the like including, for example, cell phones, pda or pad devices, portable gaming devices, personal computers, websites, interactive video, or any other electronic devices that utilize encoded data, such as ADPCM encoded data, where the decoding occurs with the state values reset for each block of data to be decoded.

While the systems and methods have been described in connection with what is presently considered to practical and preferred embodiments, it is to be understood that these systems and methods are not limited to the disclosed embodiments. For example, it will be appreciated that these aspects and embodiments may be combined in various combinations and sub-combinations to achieve yet further exemplary embodiments. Also, it will be appreciated that the exemplary embodiments herein may be implemented as any suitable combination of hardware, software or both, and/or programmed logic circuitry including, for example, hardware, software, firmware, etc. Thus, the invention is intended to cover various modifications and equivalent arrangements included within the scope of the appended claims.

What is claimed is:

1. A method for processing a streamed audio signal to reduce and/or eliminate errors due to a decoder resetting state values, comprising:

encoding a compensation signal with the audio signal;

generating the compensation signal having a characteristic selected so the encoded streamed signal substantially matches reset state values at block boundaries; and synchronizing encoding to a decoder so that the encoding duplicates the state value reset at the block boundaries;

wherein the encoded signal comprises a plurality of blocks of data, and the compensation signal adjusts the encoded signal at the beginning of each block to match a predictor value.

2. The method of claim 1, wherein the compensation signal is substantially inaudible.

3. The method of claim 1, wherein the compensation signal comprises a periodic signal having a periodicity corresponding to an encoded signal block duration.

4. The method of claim 1, wherein the compensation signal comprises an ultra-low frequency audio signal.

5. The method of claim 1, wherein the compensation signal includes an offset determined based on an error signal at block boundaries.

6. The method of claim 1, including streaming the encoded audio signal.

7. The method of claim 1, further comprising mixing the audio signal with a step index compensation signal, the step index compensation signal having a characteristic selected so that the encoded signal reduces and/or eliminates errors due to resetting of step index values at the block boundaries.

8. The method of claim 7, wherein the step index compensation signal comprises a high frequency band-limited noise signal.

9. A non-transitory computer-readable medium having stored therein instructions for encoding a streamed audio signal to reduce and/or eliminate errors due to resetting of state values, the instructions comprising instructions for:

encoding a compensation signal included in the audio signal; and generating the compensation signal having a characteristic selected so that the encoded streamed signal substantially matches the reset state values at block boundaries;

wherein the encoded signal comprises a plurality of blocks of data, and the compensation signal adjusts the encoded signal at the beginning of each block to match a predictor value.

10. The non-transitory computer-readable medium of claim 9, wherein the compensation signal is substantially inaudible.

11. The non-transitory computer-readable medium of claim 9, wherein the compensation signal comprises a periodic signal having a periodicity corresponding to an encoded signal block duration.

12. The non-transitory computer-readable medium of claim 11, wherein the compensation signal comprises an ultra-low frequency signal.

13. The non-transitory computer-readable medium of claim 9, wherein the compensation signal includes an offset determined based on an error signal at the block boundaries.

14. The non-transitory computer-readable medium of claim 9, wherein the data is streamed.

15. The non-transitory computer-readable medium of claim 9, wherein the instructions further comprise instructions for mixing the audio signal with a step index compensation signal, the step index compensation signal having a characteristic selected so that the encoded signal reduces and/or eliminates errors due to resetting of step index values at block boundaries.

16. The non-transitory computer-readable medium of claim 15, wherein the step index compensation signal comprises a high frequency band-limited noise signal.

17. An encoder structured to encode a streamed audio signal to reduce and/or eliminate errors due to resetting of state values by:

mixing a compensation signal with the audio signal;

encoding the mixed audio signal; and generating the compensation signal having a characteristic selected so the encoded mixed audio signal substantially matches the reset state values at block boundaries;

wherein the encoded signal comprises a plurality of blocks of data, and the compensation signal adjusts the encoded signal at the beginning of each block to match a predictor value.

18. The encoder of claim 17, wherein the compensation signal is substantially inaudible.

19. The encoder of claim 17, wherein the compensation signal comprises a periodic signal having a periodicity corresponding to an encoded signal block duration.

20. The encoder of claim 19, wherein the compensation signal comprises an ultra-low frequency signal.

21. The encoder of claim 17, wherein the compensation signal includes an offset determined based on an error signal at the block boundaries.

22. The encoder of claim 17, wherein the audio signal is streamed.

23. The encoder of claim 17, wherein a processor is programmed to mix the audio signal with a step index compensation signal, the step index compensation signal having a characteristic selected so that the mixed encoded audio signal reduces and/or eliminates errors due to resetting of step index values at the block boundaries.

24. The encoder of claim 23, wherein the step index compensation signal comprises a high frequency band-limited noise signal.

25. A portable electronic device, comprising:

a memory including an encoded mixed audio signal;

a buffer for receiving blocks of the encoded mixed audio signal; and a processor coupled to the memory and the buffer, the processor being programmed to cause decoding of the blocks of the encoded mixed audio signal, state values utilized in the decoding being reset at a start of the decoding of each of the blocks of the encoded mixed audio signal, wherein the encoded mixed audio signal is an audio signal mixed with a compensation signal, the compensation signal having a characteristic selected so that the encoded mixed audio signal substantially matches the reset state values at block boundaries; and wherein the encoded signal comprises a plurality of blocks of data, and the compensation signal adjusts the encoded signal at the beginning of each block to match a predictor value.

26. The portable electronic device of claim 25, wherein the compensation signal is substantially inaudible.

27. The portable electronic device of claim 25, wherein the compensation signal comprises a periodic signal having a periodicity corresponding to an encoded signal block duration.

28. The portable electronic device of claim 25, wherein the compensation signal comprises an ultra-low frequency signal.

29. The portable electronic device of claim 25, wherein the compensation signal includes an offset determined based on an error signal at the block boundaries.

30. The portable electronic device of claim 25, wherein the mixed encoded audio signal is further mixed with a step index compensation signal, the step index compensation signal having a characteristic selected so that the mixed encoded audio signal reduces and/or eliminates errors due to resetting of step index values at the block boundaries.

31. The portable electronic device of claim 30, wherein the step index compensation signal comprises a high frequency band-limited noise signal.

32. A method of decoding a signal, comprising:

resetting a decoding state value based on playback buffer access;

using the reset decoder value to decode data into the buffer;

and compensating the data in the buffer with a characteristic selected so that the compensated data is forced to substantially match the reset decoder values at block boundaries; including compensating the data with a step index compensation signal having a characteristic selected to reduce and/or eliminate errors due to resetting of step index values at block boundaries;

wherein the step index compensation signal comprises a high frequency band-limited noise signal.

33. The method of claim 32, wherein the compensation characteristic is substantially inaudible.

34. The method of claim 32, wherein the compensation characteristic comprises a periodic compensation signal having a periodicity corresponding to an encoded signal block duration.

35. The method of claim 32, wherein the compensation characteristic comprises an ultra-low frequency signal.

36. The method of claim 32 further including organizing the data in the buffer in blocks having sizes optimized to ensure said resetting occurs only at block boundaries.

37. A method of streaming an audio signal comprising:

generating an inaudible compensation signal that forces the streamed audio signal to match, at block boundaries, predictor values reset due to playback buffer loopbacks;

using the generated inaudible compensation signal to produce an encoded audio signal; and streaming the encoded audio signal to a decoder that resets predictor values at block boundaries due to playback buffer loopback, the streamed signal substantially matching reset predictor values at block boundaries;

wherein the encoded signal comprises a plurality of blocks of data, and the compensation signal adjusts the encoded signal at the beginning of each block to match the reset predictor values.

* * * * *